United States Patent
Boore et al.

(10) Patent No.: US 8,463,545 B2
(45) Date of Patent: Jun. 11, 2013

(54) RADIOLOCALIZATION RECEIVER

(75) Inventors: Lewis Boore, Massagno (CH); Ron Torten, Sovosa (CH)

(73) Assignee: QUALCOMM Incorporated, San Diego, CA (US)

( * ) Notice: Subject to any disclaimer, the term of this patent is extended or adjusted under 35 U.S.C. 154(b) by 1315 days.

(21) Appl. No.: 11/960,087

(22) Filed: Dec. 19, 2007

(65) Prior Publication Data

US 2009/0164120 A1  Jun. 25, 2009

(51) Int. Cl.
  *G01C 21/34*  (2006.01)
(52) U.S. Cl.
  USPC ........... 701/533; 701/433; 701/431; 701/410; 701/455; 455/456.1; 455/457; 455/404.2; 455/422.1; 455/427
(58) Field of Classification Search
  USPC ........................................................ 701/210
  See application file for complete search history.

(56) References Cited

U.S. PATENT DOCUMENTS

| 5,629,854 | A  | * | 5/1997 | Schulte ......................... 701/431 |
| 5,801,680 | A  | * | 9/1998 | Minakuchi .................... 345/589 |
| 6,141,570 | A  | * | 10/2000 | O'Neill et al. ................ 455/574 |
| 2002/0119791 | A1 | * | 8/2002 | Bai ............................... 455/456 |
| 2003/0191583 | A1 | * | 10/2003 | Uhlmann et al. ............ 701/208 |
| 2004/0048620 | A1 | * | 3/2004 | Nakahara et al. .......... 455/456.1 |
| 2004/0078142 | A1 | * | 4/2004 | Fuchs et al. .................. 701/213 |
| 2009/0164120 | A1 | * | 6/2009 | Boore et al. .................. 701/210 |

\* cited by examiner

*Primary Examiner* — Redhwan K Mawari
(74) *Attorney, Agent, or Firm* — Howard Seo

(57) ABSTRACT

A navigation system, device and method for assisting a mobile user in navigation. In a preferred embodiment, the device comprises a processing unit configured to execute a navigation program, output peripherals, to provide navigation instructions to the mobile user, the device having access to a satellite radiolocalization module, arranged to acquire the current location, to a map database, containing cartographic information, and to a sensor peripheral; the navigation program being further arranged to generate navigation instructions according to a computed route based on the acquired current location, the cartographic information and a desired destination; the device having a normal operation mode and at least one low-power mode, wherein the navigation device is configured to change mode according to the one or more of the following data: the current location; the computed route; data provided from the sensor peripheral; and by the corresponding method.

24 Claims, 2 Drawing Sheets

RADIOLOCALIZATION RECEIVER

FIELD OF THE INVENTION

The present application relates to the power management of navigation devices and, in particular, to portable navigation assistance devices that receive a positioning information form a satellite system and rely on autonomous energy source, for example a battery.

DESCRIPTION OF RELATED ART

Personal navigation devices (PND) are portable devices that include a GNSS receiver, or satellite radiolocalization module, which acquires and provides the current location of the user. Typically personal navigation devices include an autonomous energy source (a battery) and, as a consequence, their power consumption must be managed carefully in order to obtain the maximum possible battery duration. They include, or have access to, a map database and a processing unit that is programmed to generate navigation instructions, for example vocal messages or visual cues on a graphic display, to assist the user to find his way to a desired locality.

Mobile wireless platforms (MWP), for example personal assistants, cellular phones, smart-phones, laptop and so on, may also have a navigation function, for example because they include a GPS or GNSS receiver, or because they have access to an external GPS peripheral, like a USB or Bluetooth GPS "dongle". These devices, as well as the personal navigation devices mentioned above, rely on battery power and, therefore, must manage the power consumption in an effective way.

When an individual is navigating with a personal navigation device or a mobile wireless platform having localization function, there are three main sources of power drain: the GNSS function itself, as it acquires and tracks the satellite's signals and computes the position fix, the power consumed by the processor to update the display information (e.g. a scrolling map, a direction arrow, or a live aerial view of the route) as the person navigates, and the graphic display itself. A high or moderate-resolution LCD backlit display can easily represent the major power user in a battery operated navigation platform.

It is known to address this problem by foreseeing different operation modes for the navigation device, at least a normal mode, in which all the function and peripherals of the device are active, and a sleep mode, or low power mode, in which the device is active, but some of its function and peripherals are switched off, or limited, in order to preserve battery power. The navigation device implements a power management method, in which the modes are selectively activated, according to the need of the moment.

Patent application WO2007026046 discloses a navigational device that includes a power saving management function. The system according to this disclosure comprises a mobile GPS receiver and navigation software, wherein the navigation software is arranged to switch the mobile terminal into a power saving mode if there are no further instructions needed for a determined period of time or distance. The power saving functionality comprises turning the backlight off and changing the visualization of the display for better readability without the backlight.

Patent application JP9005102A2 similarly discloses a navigational device having a power saving function that selectively turns off some components according to position information. In particular the display unit is cut out when it is judged that no guidance operation, for example a turn or a change in direction is required.

There are also "dual use" navigation systems, that is, systems that can be used as vehicular navigation, and draw power from the car's battery and alternator, but are compact enough to be extracted from the car and carried out, as personal navigation devices. These devices also benefit from an intelligent power management.

Fixed vehicle navigation system may also profit from having various functioning modes, and in particular a sleep mode with reduced or no output. Even if there is less need to manage power carefully in a vehicle, sending the navigation device in sleep mode when it is not needed is less distracting to the driver. Moreover if the video display is shared by different system, it can be used to present other information while the navigation system is in sleep mode.

The known navigation systems may fail to exit promptly from sleep mode when a navigation information is needed, for example if the user deviates from the computed path while the navigation system is in sleep mode, the system may realize the error only after a certain time, which may be too long to allow a rapid correction.

The inventors have therefore recognized a need for a navigation device implementing an advanced power management method, minimizing the use of display for redundant information, yet allowing for the timely presentation of all the important navigation instructions. The inventors have also recognized a need for a system and method that make an optimum use of the available information.

BRIEF SUMMARY OF THE PREFERRED EMBODIMENTS

According to a preferred embodiment, these aims are achieved by a navigation device for assisting a mobile user in navigation, the device comprising a processing unit configured to execute a navigation program, output peripherals to provide navigation instructions to the mobile user, the device having access to a satellite radiolocalization module, arranged to acquire the current location, to a map database, containing cartographic information, and to a sensor peripheral; the navigation program being further arranged to generate navigation instructions according to a computed route based on the acquired current location, the cartographic information and a desired destination; the device having a normal operation mode and at least one sleep mode, wherein the navigation device is arranged to change mode according to the one or more of the following data: the current location; the computed route; data provided from the sensor peripheral; and by the corresponding method.

Another embodiment relates to a navigation system, comprising: a processor, configured to execute a navigation program; at least one output peripheral configured to provide navigation instructions to a mobile user; a satellite radiolocalization module, configured to acquire data representative of a current location; wherein the system has at least one normal operation mode and at least one low-power mode; and wherein the system is configured to change mode based on one or more of the following: the current location; the computed route; data provided from a sensor peripheral. The navigation system may further be so configured to switch from a low-power mode to a normal mode based on data received from a sensor peripheral. The sensor peripheral may be one of: an accelerometer, a pressure sensor, a magnetic compass, a gyroscope, a tachometer, a radio receiver, or a network interface.

The navigation system may further be so configured to enter into a low-power mode when a next instruction point in a computed route and a current location are farther than a set value. The navigation system may also be so configured to switch from a low-power mode to a normal mode when a next instruction point in a computed route and a current location are nearer than a set value. The navigation system may further be so configured to switch from a low-power mode to a normal mode when the current location and the computed route are farther than a set value.

The navigation system may further be so configured to provide communication between the processor and the radiolocalization module occurs at least in part wirelessly. Optionally, the processor of the navigation system is configured to access a cartographic system. The cartographic system may be included in the navigation system; and the processor may be configured to calculate a route and provide cue information. Access to the cartographic system may also occur at least in part over a communications interface. In this case, the processor may be configured to receive cue information over a communications interface, and cause the cue information to be output to a peripheral. The output peripherals may comprise a display and a loudspeaker, and may be at least partially disabled during a low-power mode.

Still another embodiment relates to a method of mode management in a navigation device, comprising: accessing a radiolocalization receiver to receive data indicative of a position of a navigation device; receiving cartographic information indicative of a route; and changing from a first power management mode to a second power management mode based on one or more of the following: the current location; the computed route; data provided from a sensor peripheral. The method may further comprise the step of switching from a low-power mode to a normal mode based on data received from a sensor peripheral. The method may also be carried out such that the sensor peripheral is one of: an accelerometer, a pressure sensor, a magnetic compass, a gyroscope, a tachometer, a radio receiver, or a network interface.

The method optionally further comprises the steps of outputting cue information to an output peripheral comprising a display or a loudspeaker; and partially disabling the output peripheral during a low-power mode. The method may performed such that the step of receiving cartographic information indicative of a route comprises receiving cartographic information over a communications interface. The method may also be performed such that the step of receiving cartographic information indicative of a route comprises receiving cartographic information from a local memory. The method can further comprise calculating a current position based on information received from the data indicative of a position of a navigation device. The method can also further comprise transmitting the data indicative of a position of a navigation device to a remote receiver.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 3:
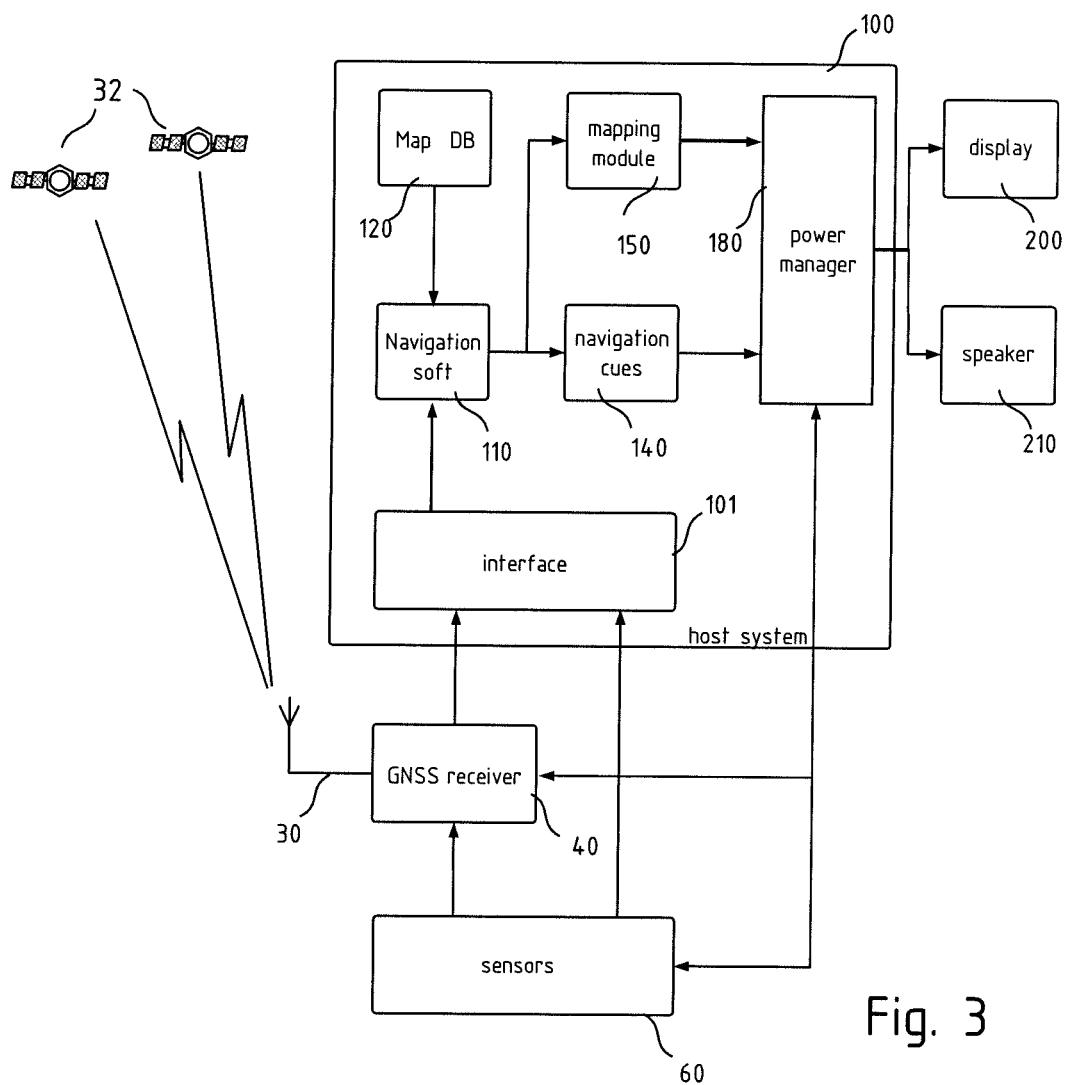
FIG. 3 shows an exemplary diagram of a device embodiment of the present invention and exemplary communication facilities.

FIG. 3 presents, in a schematic block diagram, a possible structure for a navigation device according to one embodiment of the present invention. It includes a GNSS (Global Navigation Satellite System, e.g., Global Positioning System, Galileo, GLONASS, Compass or combinations thereof) receiver 40, equipped with an antenna 30, receiving radiolocalization signals from a constellation of satellites 32, for example GPS satellites, and providing positioning information in real time.

The navigation device also comprises an additional sensor peripheral 60, which can be an inertial sensor like an accelerometer, or a gyroscope, for example, to provide additional information that can be used to establish the position and dynamic behavior of the receiver. The sensor peripheral 60 could also comprise a magnetic compass, or a sensor of atmospheric pressure, in order to give the heading or the altitude respectively of the receiver. According to another embodiment of the invention, the sensor peripheral 60 could be a network interface, for example a wireless internet interface, or a connection with a cell telephone network, or a receiver for a broadcast radio station, for example a FM or DAB or satellite radio receiver.

The host system 100 includes processor configured to execute different software modules, including the navigation software 110, the navigation cue handler 140, the mapping module 150, and the power manager 180. The software modules are embedded in one or more memories (volatile or non-volatile) or other machine readable media prior to execution. The software elements can, for example, have access to a cartographic database 120, containing mapping information necessary to calculate a route to reach a desired destination, and to plot a map on the display 200, updated to reflect the actual position of the receiver. The host system has also access, by the interface 101, to the positioning information provided by the GNSS receiver 40, and to the output of the sensor 60. In other preferred embodiments, the system 100 has access to these various resources as distributed over a network through a communications interface, such as a network interface.

The host system 100 could be a PDA, bi-directional radio or a cellular telephone, for example, having access to a GPS receiver internally or by a Bluetooth interface. The present invention, however, is not limited to these kinds of navigation devices, and also includes integrated dedicated devices, in which the GNSS receiver and the navigation and mapping processor are integrated in one single module or complete device. Embodiments of the invention also include the case in which the GNSS receiver does not process the radiolocalization signal completely to provide a positional fix, but rather this computation is completed in the host system 100.

Figure 1:
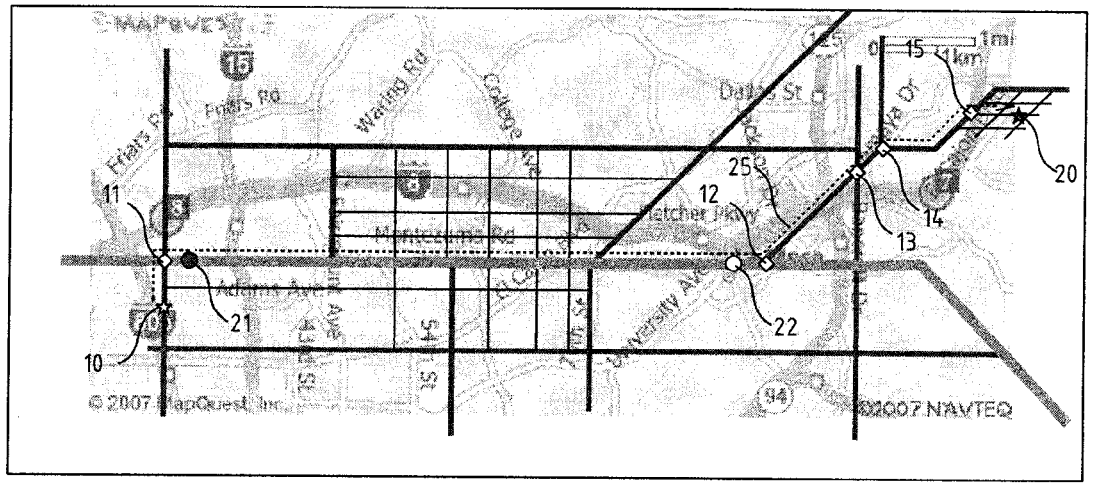
FIG. 1 shows a map view of a planned route.

An aspect of one embodiment will now be illustrated with reference to FIG. 1 showing a simplified map diagram, illustrating schematically the structure of a portable navigation device. Initially the navigation program 10 (FIG. 3) instructs the mapping module 150 to draw a map on the display 200, showing the actual position 10 of the user, based on the cartographic information retrieved from the map database 120.

The user, located at initial position 10, requests navigation assistance to reach the destination point 20. The navigation software 10 computes a route 25, to point 20. It identifies waypoints 11, 12, 13, 14, and 15, at which navigation cues will be required (e.g. "turn right" at waypoint 11, and so on), and transmits these instructions, when the waypoints are approached, to the cue handler 140 that translates them into visual messages for the display 200 and vocal instruction for the loudspeaker 210.

In an alternative embodiment, the navigation device computes a present location or information sufficient for the present location to be computed (such as measurements of pseudoranges to the device at a particular network time), and transmits this information to a remote station. The remote station evalutes or computes the position of the navigation device, and computes a route 25 to point 20. At various intervals, the remote station transmits data to the navigation receiver that can be interpreted as instructions, such as "turn right at waypoint 11", and so on. The cue handler 140 or other appropriate software translates these data into visual messages for the display 200 and vocal instructions for the loudspeaker 200.

The power manager unit determines, along the route 25, additional points at which the navigation device can enter in sleep mode, based on the position and route information. For example, at point 21, since the successive waypoint 12 in the example is sufficiently far away in time and/or in space, the power manager 180 puts the navigation device in sleep mode, and back in normal mode at point 22, in time to deliver the navigation cue for waypoint 12 ("turn left"). During sleep mode, the power manager switches off selectively some functions, like for example the display 200 and the speaker 210, in order to save energy and to avoid distracting the user.

The criteria followed by the power manager 180 in determining the mode switch can be based on the planned route, for example if the distance to the successive waypoint, or navigation cue exceeds a set threshold in time and/or in space. The power manager may base its decision also on the actual position, given from the GNSS receiver 40 and/or on the data delivered from the sensor 60.

Figure 2:
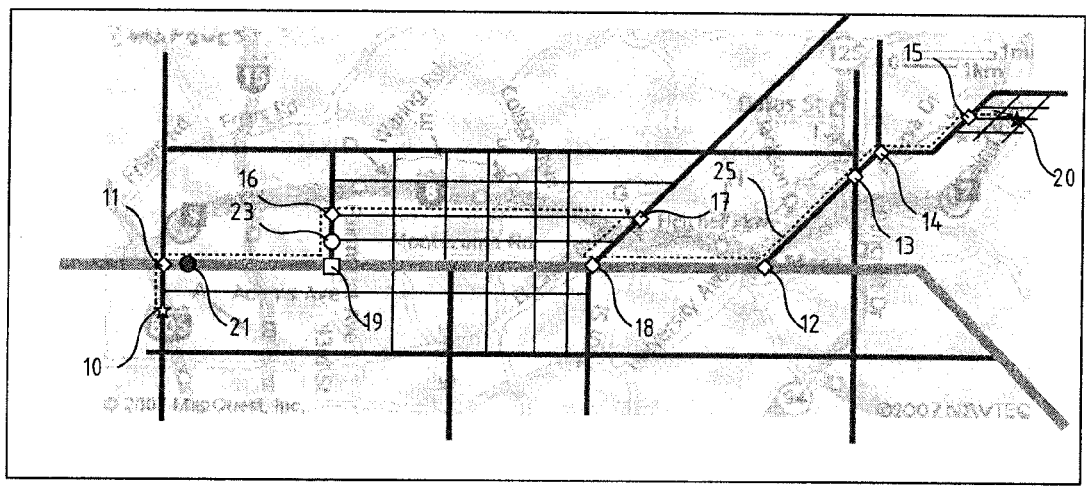
FIG. 2 shows a map view of a planned route.

FIG. 2 shows another example of an advanced decision of the power manager. In this case the user deviates from the planned route at point 19. The navigation device 100 updates the route 25 to reflect the actual position, and generates cues to turn right at point 16 and at point 17, thus putting the user back en route to the desired destination 20. The power manager enters normal mode at point 23.

Different factors can be used, in variant of the presently described embodiments, to determine a switch from sleep mode to normal mode. An instantaneous speed exceeding a set limit, for example, could trigger the navigation device out of sleep mode. The speed can be obtained from the GNSS receiver itself, or from the auxiliary device 60, if this includes a speed sensor or an accelerometer. If the navigation device is included in the equipment of a car or wheeled vehicle, the auxiliary sensor 60 could include a tachometer measuring the wheel's angular speed, for example.

The sensor 60 could also show an unexpected change of direction, for example if it includes a magnetic compass or a gyroscope, thus prompting the power manager to exit from sleep mode.

According to another embodiment of the present invention, the navigation device could enter into normal mode or into sleep mode when the actual position approaches, within a set distance, certain points, stored in a non-volatile memory in the navigation device, or obtained by a network interface included in the sensor 60. For example the sensor 60 could include a wireless network interface, and receive a list of special points of interest that will cause the navigation device to exit sleep mode and generate a special cue when approached. These points of interest may include, for example, speeding radars, monuments, and locations of general interest, or commercial exercises.

According to yet another embodiment of the invention, the sensor could include a FM, DAB or satellite receiver, and the navigation device be arranged to exit sleep mode when the radio receives a TMC feed or a traffic information feed. Preferably the navigation device would filter the TMC feeds according to the actual position as given by the GNSS receiver, and exit from sleep mode only upon reception of information relevant to the actual location or the programmed route.

The invention claimed is:

1. A navigation system, comprising:
   a processor, configured to execute a navigation program stored in a machine-readable medium;
   at least one output peripheral configured to provide navigation instructions to a mobile user; and
   a satellite radiolocalization module, configured to acquire data representative of a current location,
   wherein the navigation system has at least one normal operation mode and at least one low-power mode, and wherein the system is configured to change mode based on one or more of the following: a current location, a computed route, or data provided from a sensor peripheral,
   wherein the navigation system is configured to switch from a low-power mode to a normal operation mode based on the data provided from the sensor peripheral,
   wherein the sensor peripheral is one of: a pressure sensor or a gyroscope.

2. The navigation system of claim 1, wherein the navigation system is configured to enter into a low-power mode when a next instruction point in the computed route and the current location are farther than a set value.

3. The navigation system of claim 1, wherein the navigation system is arranged to switch from a low-power mode to a normal operation mode when a next instruction point in the computed route and the current location are nearer than a set value.

4. The navigation system of claim 1, wherein the navigation system is arranged to switch from a low-power mode to a normal operation mode when the current location and a next instruction point in the computed route are farther than a set value.

5. The navigation system of claim 1, wherein communication between the processor and the radiolocalization module occurs at least in part wirelessly.

6. The navigation system of claim 1, wherein the processor is configured to access a cartographic system.

7. The navigation system of claim 6, wherein the cartographic system is included in the navigation system; and the processor is configured to calculate a route and provide cue information.

8. The navigation system of claim 1, in which the output peripherals comprise a display and a loudspeaker, and in which the output peripherals are at least partially disabled during a low-power mode.

9. A method of navigation, comprising:
   executing a navigation program stored in a machine-readable medium;
   providing navigation instructions to a mobile user;
   acquiring data representative of a current location; and
   changing a mode based on one or more of the following: a current location, a computed route, or data provided from a sensor peripheral, wherein the mode comprises at least one normal operation mode and at least one low-power mode,
   the changing the mode comprising switching from a low-power mode to a normal operation mode based on the data provided from the sensor peripheral,
   wherein the sensor peripheral is one of: a pressure sensor or a gyroscope.

10. The method of claim 9, the changing the mode further comprising entering into a low-power mode when a next instruction point in the computed route and the current location are farther than a set value.

11. The method of claim 9, the changing the mode further comprising switching from a low-power mode to a normal operation mode when a next instruction point in the computed route and the current location are nearer than a set value.

12. The method of claim 9, the changing the mode further comprising switching from a low-power mode to a normal operation mode when the current location and a next instruction point in the computed route are farther than a set value.

13. An apparatus for navigation, comprising:
   means for executing a navigation program stored in a machine-readable medium;
   means for providing navigation instructions to a mobile user;
   means for acquiring data representative of a current location; and
   means for changing a mode based on one or more of the following: a current location, a computed route, or data provided from a sensor peripheral, wherein the mode comprises at least one normal operation mode and at least one low-power mode,
   the means for changing the mode configured to switch from a low-power mode to a normal operation mode based on the data provided from the sensor peripheral,
   wherein the sensor peripheral is one of: a pressure sensor or a gyroscope.

14. The apparatus of claim 13, the means for changing the mode further configured to enter into a low-power mode when a next instruction point in the computed route and the current location are farther than a set value.

15. The apparatus of claim 13, the means for changing the mode further configured to switch from a low-power mode to a normal operation mode when a next instruction point in the computed route and the current location are nearer than a set value.

16. The apparatus of claim 13, the means for changing the mode further configured to switch from a low-power mode to a normal operation mode when the current location and a next instruction point in the computed route are farther than a set value.

17. An apparatus for navigation, comprising:
   a processing system configured to:
   execute a navigation program stored in a machine-readable medium;
   provide navigation instructions to a mobile user;
   acquire data representative of a current location; and
   change a mode based on one or more of the following: a current location, a computed route, or data provided from a sensor peripheral, wherein the mode comprises at least one normal operation mode and at least one low-power mode,
   the processing system configured to change the mode configured to switch from a low-power mode to a normal operation mode based on the data provided from the sensor peripheral,
   wherein the sensor peripheral is one of: a pressure sensor or a gyroscope.

18. The apparatus of claim 17, the processing system configured to change the mode further configured to enter into a low-power mode when a next instruction point in the computed route and the current location are farther than a set value.

19. The apparatus of claim 17, the processing system configured to change the mode further configured to switch from a low-power mode to a normal operation mode when a next instruction point in the computed route and the current location are nearer than a set value.

20. The apparatus of claim 17, the processing system configured to change the mode further configured to switch from a low-power mode to a normal operation mode when the current location and a next instruction point in the computed route are farther than a set value.

21. A computer program product for navigation, comprising:
   a non-transitory computer-readable medium comprising code for:
   executing a navigation program stored in the computer-readable medium;
   providing navigation instructions to a mobile user;
   acquiring data representative of a current location; and
   changing a mode based on one or more of the following: a current location, a computed route, or data provided from a sensor peripheral, wherein the mode comprises at least one normal operation mode and at least one low-power mode,
   the code for changing the mode configured to switch from a low-power mode to a normal operation mode based on the data provided from the sensor peripheral,
   wherein the sensor peripheral is one of: a pressure sensor or a gyroscope.

22. The computer program product of claim 21, the code for changing the mode further configured to enter into a low-power mode when a next instruction point in the computed route and the current location are farther than a set value.

23. The computer program product of claim 21, the code for changing the mode further configured to switch from a low-power mode to a normal operation mode when a next instruction point in the computed route and the current location are nearer than a set value.

24. The computer program product of claim 21, the code for changing the mode further configured to switch from a low-power mode to a normal operation mode when the current location and a next instruction point in the computed route are farther than a set value.

* * * * *